United States Patent
Min et al.

(10) Patent No.: US 10,605,904 B2
(45) Date of Patent: Mar. 31, 2020

(54) SYSTEMS AND METHODS OF WIRELESS POSITION TRACKING

(71) Applicant: POSITION IMAGING, INC., Portsmouth, NH (US)

(72) Inventors: Guohua Min, Exeter, NH (US); Mark Schneider, Williston, VT (US)

(73) Assignee: POSITION IMAGING, INC., Portsmouth, NH (US)

( * ) Notice: Subject to any disclaimer, the term of this patent is extended or adjusted under 35 U.S.C. 154(b) by 0 days.

(21) Appl. No.: 15/953,798

(22) Filed: Apr. 16, 2018

(65) Prior Publication Data
US 2018/0231649 A1    Aug. 16, 2018

Related U.S. Application Data

(62) Division of application No. 14/354,833, filed as application No. PCT/US2012/064860 on Nov. 13, 2012, now Pat. No. 9,945,940.

(60) Provisional application No. 61/558,032, filed on Nov. 10, 2011, provisional application No. 61/558,082, filed on Nov. 10, 2011.

(51) Int. Cl.
| | |
|---|---|
| *G01S 11/10* | (2006.01) |
| *G01S 5/08* | (2006.01) |
| *H04W 64/00* | (2009.01) |

(52) U.S. Cl.
CPC .............. *G01S 11/10* (2013.01); *G01S 5/08* (2013.01); *H04W 64/003* (2013.01)

(58) Field of Classification Search
CPC .. G01S 5/08; G01S 5/14; G01S 11/10; H04W 64/003

USPC ......................................................... 342/450
See application file for complete search history.

(56) References Cited

U.S. PATENT DOCUMENTS

| | | |
|---|---|---|
| 2,408,122 A | 9/1946 | Wirkler |
| 3,824,596 A | 7/1974 | Guion et al. |
| 3,940,700 A | 2/1976 | Fischer |
| 4,328,499 A | 5/1982 | Anderson et al. |
| 5,010,343 A | 4/1991 | Andersson |

(Continued)

FOREIGN PATENT DOCUMENTS

| | | |
|---|---|---|
| WO | 2001006401 A1 | 1/2001 |
| WO | 2005010550 A1 | 2/2005 |

OTHER PUBLICATIONS

Dictionary Definition for Peripheral Equipment. (2001). Hargrave's Communications Dictionary, Wiley. Hoboken, NJ: Wiley. Retrieved from Https://search.credorefernce.com/content/entry/hargravecomms/peripheral_equioment/0 (Year:2001).

(Continued)

*Primary Examiner* — Dao L Phan
(74) *Attorney, Agent, or Firm* — Schmeiser, Olsen & Watts LLP

(57) ABSTRACT

Position and orientation tracking systems and methods include a transmitting antenna transmitting a radio frequency (RF) signal. At least one receiving antenna acquires the RF signal. One of the at least one receiving antenna and the transmitting antenna is designated a reference antenna. A processing unit determines a phase difference between the RF signal received by each receiving antenna and the reference antenna. The processing unit computes a position of the transmitting antenna with respect to the at least one receiving antenna in response to the phase difference determined for each receiving antenna.

27 Claims, 13 Drawing Sheets

(56) References Cited

U.S. PATENT DOCUMENTS

| | | |
|---|---|---|
| 5,343,212 A | 8/1994 | Rose et al. |
| 5,426,438 A | 6/1995 | Peavey et al. |
| 5,510,800 A | 4/1996 | McEwan |
| 5,574,468 A | 11/1996 | Rose |
| 5,592,180 A | 1/1997 | Yokev et al. |
| 5,600,330 A | 2/1997 | Blood |
| 5,657,026 A | 8/1997 | Culpepper et al. |
| 5,923,286 A | 7/1999 | Divakaruni |
| 5,953,683 A | 9/1999 | Hansen et al. |
| 6,088,653 A | 7/2000 | Sheikh et al. |
| 6,101,178 A | 8/2000 | Beal |
| 6,167,347 A | 12/2000 | Lin |
| 6,255,991 B1 | 7/2001 | Hedin |
| 6,292,750 B1 | 9/2001 | Lin |
| 6,409,687 B1 | 6/2002 | Foxlin |
| 6,412,748 B1 | 7/2002 | Girard |
| 6,417,802 B1 | 7/2002 | Diesel |
| 6,496,778 B1 | 12/2002 | Lin |
| 6,512,748 B1 | 1/2003 | Mizuki et al. |
| 6,593,885 B2 | 7/2003 | Wisherd et al. |
| 6,630,904 B2 | 10/2003 | Gustafson et al. |
| 6,683,568 B1 | 1/2004 | James et al. |
| 6,697,736 B2 | 2/2004 | Lin |
| 6,720,920 B2 | 4/2004 | Breed et al. |
| 6,721,657 B2 | 4/2004 | Ford et al. |
| 6,744,436 B1 | 6/2004 | Chirieleison et al. |
| 6,750,816 B1 | 6/2004 | Kunysz |
| 6,861,982 B2 | 3/2005 | Forstrom et al. |
| 6,867,774 B1 | 3/2005 | Halmshaw et al. |
| 6,989,789 B2 | 1/2006 | Ferreol et al. |
| 7,009,561 B2 | 3/2006 | Menache et al. |
| 7,143,004 B2 | 11/2006 | Townsend et al. |
| 7,168,618 B2 | 1/2007 | Schwartz |
| 7,190,309 B2 | 3/2007 | Hill |
| 7,193,559 B2 | 3/2007 | Ford et al. |
| 7,236,091 B2 | 6/2007 | Kiang et al. |
| 7,236,092 B1 | 6/2007 | Joy |
| 7,292,189 B2 | 11/2007 | Orr et al. |
| 7,295,925 B2 | 11/2007 | Breed et al. |
| 7,315,281 B2 | 1/2008 | Dejanovic et al. |
| 7,336,078 B1 | 2/2008 | Merewether et al. |
| 7,409,290 B2 | 8/2008 | Lin |
| 7,443,342 B2 | 10/2008 | Shirai et al. |
| 7,499,711 B2 | 3/2009 | Hoctor et al. |
| 7,533,569 B2 | 5/2009 | Sheynblat |
| 7,612,715 B2 | 11/2009 | Macleod |
| 7,646,330 B2 | 1/2010 | Karr |
| 7,868,760 B2 | 1/2011 | Smith et al. |
| 7,876,268 B2 | 1/2011 | Jacobs |
| 7,933,730 B2 | 4/2011 | Li et al. |
| 8,269,624 B2 | 9/2012 | Chen et al. |
| 8,457,655 B2 | 6/2013 | Zhang et al. |
| 8,749,433 B2 | 6/2014 | Hill |
| 8,860,611 B1 | 10/2014 | Anderson et al. |
| 8,957,812 B1 | 2/2015 | Hill et al. |
| 9,063,215 B2 | 6/2015 | Perthold et al. |
| 9,092,898 B1 | 7/2015 | Fraccaroli et al. |
| 9,120,621 B1 | 9/2015 | Curlander |
| 9,141,194 B1 | 9/2015 | Keyes et al. |
| 9,174,746 B1 | 11/2015 | Bell et al. |
| 9,482,741 B1 | 11/2016 | Min et al. |
| 9,497,728 B2 | 11/2016 | Hill |
| 9,519,344 B1 | 12/2016 | Hill |
| 9,782,669 B1 | 10/2017 | Hill |
| 9,872,151 B1 | 1/2018 | Puzanov et al. |
| 9,933,509 B2 | 4/2018 | Hill et al. |
| 9,961,503 B2 | 5/2018 | Hill |
| 10,180,490 B1 | 1/2019 | Schneider et al. |
| 10,257,654 B2 | 4/2019 | Hill |
| 2002/0021277 A1 | 2/2002 | Kramer et al. |
| 2002/0140745 A1 | 10/2002 | Ellenby |
| 2003/0053492 A1 | 3/2003 | Matsunaga |
| 2003/0120425 A1 | 6/2003 | Stanley et al. |
| 2003/0176196 A1 | 9/2003 | Hall et al. |
| 2003/0195017 A1 | 10/2003 | Chen et al. |
| 2004/0095907 A1 | 5/2004 | Agee et al. |
| 2004/0107072 A1 | 6/2004 | Dietrich et al. |
| 2004/0176102 A1 | 9/2004 | Lawrence et al. |
| 2004/0203846 A1 | 10/2004 | Caronni et al. |
| 2005/0001712 A1 | 1/2005 | Yarbrough |
| 2005/0057647 A1 | 3/2005 | Nowak |
| 2005/0143916 A1 | 6/2005 | Kim et al. |
| 2005/0184907 A1 | 8/2005 | Hall et al. |
| 2005/0275626 A1 | 12/2005 | Mueller et al. |
| 2006/0013070 A1 | 1/2006 | Holm et al. |
| 2006/0022800 A1 | 2/2006 | Krishna et al. |
| 2006/0061469 A1 | 3/2006 | Jaeger et al. |
| 2006/0066485 A1 | 3/2006 | Min |
| 2006/0101497 A1 | 5/2006 | Hirt et al. |
| 2006/0192709 A1 | 8/2006 | Schantz et al. |
| 2006/0279459 A1 | 12/2006 | Akiyama et al. |
| 2006/0290508 A1 | 12/2006 | Moutchkaev et al. |
| 2007/0060384 A1 | 3/2007 | Dohta |
| 2007/0138270 A1 | 6/2007 | Reblin |
| 2007/0205867 A1 | 9/2007 | Kennedy et al. |
| 2007/0210920 A1 | 9/2007 | Panotopoulos |
| 2007/0222560 A1 | 9/2007 | Posamentier |
| 2008/0007398 A1 | 1/2008 | DeRose et al. |
| 2008/0048913 A1 | 2/2008 | Macias et al. |
| 2008/0143482 A1 | 6/2008 | Shoarinejad et al. |
| 2008/0150678 A1 | 6/2008 | Giobbi et al. |
| 2008/0154691 A1 | 6/2008 | Wellman et al. |
| 2008/0174485 A1 | 7/2008 | Carani et al. |
| 2008/0204322 A1 | 8/2008 | Oswald et al. |
| 2008/0266253 A1 | 10/2008 | Seeman et al. |
| 2008/0281618 A1 | 11/2008 | Mermet et al. |
| 2008/0316324 A1 | 12/2008 | Rofougaran et al. |
| 2009/0043504 A1 | 2/2009 | Bandyopadhyay et al. |
| 2009/0149202 A1 | 6/2009 | Hill et al. |
| 2009/0224040 A1 | 9/2009 | Kushida et al. |
| 2009/0243932 A1 | 10/2009 | Moshfeghi |
| 2009/0323586 A1 | 12/2009 | Hohl et al. |
| 2010/0090852 A1 | 4/2010 | Eitan et al. |
| 2010/0097208 A1 | 4/2010 | Rosing et al. |
| 2010/0103173 A1 | 4/2010 | Lee et al. |
| 2010/0103989 A1 | 4/2010 | Smith et al. |
| 2010/0123664 A1 | 5/2010 | Shin et al. |
| 2010/0159958 A1 | 6/2010 | Naguib et al. |
| 2011/0006774 A1 | 1/2011 | Baiden |
| 2011/0037573 A1 | 2/2011 | Choi |
| 2011/0187600 A1 | 8/2011 | Landt |
| 2011/0208481 A1 | 8/2011 | Slastion |
| 2011/0210843 A1 | 9/2011 | Kummetz |
| 2011/0241942 A1 | 10/2011 | Hill |
| 2011/0256882 A1 | 10/2011 | Markhovsky et al. |
| 2011/0264520 A1 | 10/2011 | Puhakka |
| 2012/0013509 A1 | 1/2012 | Wisherd et al. |
| 2012/0127088 A1 | 5/2012 | Pance et al. |
| 2012/0176227 A1 | 7/2012 | Nikitin |
| 2012/0184285 A1 | 7/2012 | Sampath et al. |
| 2012/0286933 A1 | 11/2012 | Hsiao |
| 2012/0319822 A1 | 12/2012 | Hansen |
| 2013/0018582 A1 | 1/2013 | Miller et al. |
| 2013/0021417 A1 | 1/2013 | Ota et al. |
| 2013/0029685 A1 | 1/2013 | Moshfeghi |
| 2013/0036043 A1 | 2/2013 | Faith |
| 2013/0113993 A1 | 5/2013 | Dagit, III |
| 2013/0314210 A1 | 11/2013 | Schoner et al. |
| 2014/0022058 A1 | 1/2014 | Striemer et al. |
| 2014/0253368 A1 | 9/2014 | Holder |
| 2014/0300516 A1 | 10/2014 | Min et al. |
| 2014/0361078 A1 | 12/2014 | Davidson |
| 2015/0009949 A1 | 1/2015 | Khoryaev et al. |
| 2015/0039458 A1 | 2/2015 | Reid |
| 2015/0091757 A1 | 4/2015 | Shaw et al. |
| 2015/0134418 A1 | 5/2015 | Leow et al. |
| 2015/0169916 A1 | 6/2015 | Hill et al. |
| 2015/0221135 A1 | 8/2015 | Hill et al. |
| 2015/0323643 A1 | 11/2015 | Hill et al. |
| 2015/0362581 A1 | 12/2015 | Friedman |
| 2015/0379366 A1 | 12/2015 | Nomura |
| 2016/0035078 A1 | 2/2016 | Lin |
| 2016/0142868 A1 | 5/2016 | Kulkarni et al. |
| 2016/0150196 A1 | 5/2016 | Horvath |

(56) References Cited

U.S. PATENT DOCUMENTS

| | | |
|---|---|---|
| 2016/0156409 A1 | 6/2016 | Chang |
| 2016/0178727 A1 | 6/2016 | Bottazzi |
| 2016/0238692 A1 | 8/2016 | Hill et al. |
| 2016/0256100 A1 | 9/2016 | Jacofsky et al. |
| 2016/0286508 A1 | 9/2016 | Khoryaev et al. |
| 2016/0366561 A1 | 12/2016 | Min et al. |
| 2016/0370453 A1 | 12/2016 | Boker et al. |
| 2016/0371574 A1 | 12/2016 | Nguyen et al. |
| 2017/0030997 A1 | 2/2017 | Hill |
| 2017/0031432 A1 | 2/2017 | Hill |
| 2017/0234979 A1 | 8/2017 | Mathews et al. |
| 2017/0280281 A1 | 9/2017 | Pandey et al. |
| 2017/0323174 A1 | 11/2017 | Joshi et al. |
| 2017/0350961 A1 | 12/2017 | Hill |
| 2017/0372524 A1 | 12/2017 | Hill |
| 2018/0068266 A1 | 3/2018 | Kirmani |
| 2018/0164103 A1 | 6/2018 | Hill |
| 2018/0197139 A1 | 7/2018 | Hill |
| 2019/0090744 A1 | 3/2019 | Mahfouz |

OTHER PUBLICATIONS

Wilde, Andreas, "Extended Tracking Range Delay-Locked Loop," Proceedings IEEE International Conference on Communications, Jun. 1995, pp. 1051-1054.

Hill, Edward L., "System and Method of Personalized Navigation Inside a Business Enterprise," U.S. Appl. No. 16/163,708, filed Oct. 18, 2018.

Li, et al. "Multifrequency-Based Range Estimation of RFID Tags," IEEE International Conference on RFID, 2009.

Welch, Greg and Gary Bishop, "An Introduction to the Kalman Filter," Department of Computer Science, University of North Carolina at Chapel Hill, Chapel Hill, NC 27599-3175, Updated: Monday, Jul. 24, 2006.

Hill, et al. "Position Tracking System and Method Using Radio Signals and Inertial Sensing" U.S. Appl. No. 14/600,025, filed Jan. 20, 2015.

Min, et al. "Expandable, Decentralized Position Tracking Systems and Methods" U.S. Appl. No. 15/446,602, filed Mar. 1, 2017.

Hill, Edward L. "Wireless Relay Station for Radio Frequency-Based Tracking System" U.S. Appl. No. 15/961,274, filed Apr. 24, 2018.

Hill, et al. "Package Tracking Systems and Methods" U.S. Appl. No. 15/091,180, filed Apr. 5, 2016.

Seiger, et al. "Modular Shelving Systems for Package Tracking" U.S. Appl. No. 15/270,749, filed Sep. 20, 2016.

Hill, et al. "Video for Real-Time Confirmation in Package Tracking Systems" U.S. Appl. No. 15/416,366, filed Jan. 26, 2017.

Piotrowski, et al. "Light-Based Guidance for Package Tracking Systems" U.S. Appl. No. 15/416,379, filed Jan. 26, 2017.

Hill, et al. "Spatial Diveristy for Relative Position Tracking" U.S. Appl. No. 15/404,668, filed Jan. 12, 2017.

Notice of Allowance in U.S. Appl. No. 14/354,833 dated Oct. 6, 2017; 7 pages.

Notice of Allowance in U.S. Appl. No. 14/354,833 dated Mar. 8, 2018; 5 pages.

Non-Final Office Action in U.S. Appl. No. 14/354,833 dated Apr. 18, 2017; 6 pages.

Restriction Requirement in U.S. Appl. No. 14/354,833 dated Dec. 12, 2016; 6 pages.

Morbella N50: 5-inch GPS Navigator User's Manual, Maka Technologies Group, May 2012.

Proakis, John G. and Masoud Salehi, "Communication Systems Engineering", Second Edition, Prentice-Hall, Inc., Upper Saddle River, New Jersey, 2002; 815 pages.

Schmidt & Phillips, "INS/GPS Integration Architectures", NATO RTO Lecture Seriers, First Presented Oct. 20-21, 2003; 24 pages.

J. Farrell & M. Barth, "The Global Positioning System & Inertial Navigation" pp. 245-252 (McGraw-Hill,1999).

Grewal & Andrews, "Global Positioning Systems, Inertial Nagivation, and Integration", 2001, John Weiley and Sons, pp. 252-256.

"Development of a Precise GPS/INS/On-Board Vehicle Sensors Integrated Vehicular Positioning System," Jianchen Gao, UCGE Reports No. 20255, Jun. 2007.

Goodall, Christopher L., "Improving Usability of Low-Cost INS/GPS Navigation Systems using Intelligent Techniques", Jan. 2009, UCGE Reports No. 20276; 234 pages.

Vikas Kumar N., "Integration of Inertial Navigation System and Global Positioning System Using Kalman Filtering", M.Tech Dissertation, Indian Institute of Technology, Bombay, Mumbai, Jul. 2004; 69 pages.

Filho, et al., "Integrated GPS/INS Navigation System Based on a Gyrpscope-Free IMU", DINCON Brazilian Conference on Synamics, Control, and Their Applications, May 22-26, 2006; 6 pages.

International Search Report and Written Opinion in International Patent Application No. PCT/US12/64860, dated Feb. 28, 2013; 8 pages.

International Preliminary Report on Patentability in international patent application No. PCT/US12/64860, dated May 22, 2014; 7 pages.

"ADXL/ADXL210 Product Sheet", Analog Devices, Inc., Analog.com, 1999; 11 pages.

Pourhomayoun, Mohammad and Mark Fowler, "Improving WLAN-based Indoor Mobile Positioning Using Sparsity," Conference Record of the Forty Sixth Asilomar Conference on Signals, Systems and Computers, Nov. 4-7, 2012, pp. 1393-1396, Pacific Grove, California.

International Preliminary Report on Patentability in International Patent Application No. PCT/US13/75277, dated Jun. 25, 2015; 7 pages.

Yang, Yong, "Tightly Coupled MEMS INS/GPS Integration with INS Aided Receiver Tracking Loops", Jun. 2008, UCGE Reports No. 20270; 205 pages.

Sun, Debo, "Ultra-Tight GPS/Reduced IMU for Land Vehicle Navigation", Mar. 2010, UCGE Reports No. 20305; 254 pages.

Sun, et al., "Analysis of the Kalman Filter With Different INS Error Models for GPS/INS Integration in Aerial Remote Sensing Applications", Bejing, 2008, The International Archives of the Photogrammerty, Remote Sensing and Spatial Information Sciences vol. XXXVII, Part B5.; 8 pages.

"Integration of a GPS aided Strapdown Inertial Navigation System for Land Vehicles," Adrian Schumacher, KTH Electrical Engineering, XR-EE-SB 2006:006.

Gautier, Jennifer Denise, "GPS/INS Generalized Evaluation Tool (GIGET) for the Design and Testing of Integrated Navigation Systems", Dissertation, Stanford University, Jun. 2003; 160 pages.

"Real-time differential Carrier Phase GPS-Aided INS," Jay Farrell, tony Givargis, Matthew Barth, IEEE Transactions on control Systems Technology, vol. 8, No. 4, Jul. 2000.

Alban, Santiago, "Design and Performance of a Robust GPS/INS Attitude System for Automobile Applications", Dissertation, Stanford University, Jun. 2004; 218 pages.

U.S. Appl. No. 13/975,724, filed Aug. 26, 2013, entitled, "Radio Frequency Communication System'" 22 pages.

International Search Report and Written Opinion in International Patent Application No. PCT/US13/75277, dated Apr. 7, 2014; 7 pages.

SYSTEMS AND METHODS OF WIRELESS POSITION TRACKING

CROSS-REFERENCE TO RELATED APPLICATIONS

This application is a division of, and claims priority to and the benefits under 35 U.S.C. §§ 120 and 121 of, co-pending U.S. application Ser. No. 14/354,833 filed Apr. 28, 2014 and titled "SYSTEMS AND METHODS OF WIRELESS POSITION TRACKING," which claims the benefit of and priority to U.S. provisional application No. 61/558,032, filed Nov. 10, 2011 and titled "Wireless Tracking System using CDMA and Phase for Timing Comparisons," and the benefit of and priority to U.S. provisional application No. 61/558,082, filed Nov. 10, 2011, titled "Radio Frequency Tracking Device," the entireties of which applications are incorporated by reference herein for all purposes.

FIELD OF THE INVENTION

The invention relates generally to position tracking systems and method. More particularly, the invention relates to systems and methods for wireless position tracking of mobile handheld, wireless, and wired devices.

BACKGROUND

Position tracking involves identifying an entity's location in a predefined environment (e.g., two dimensional or three dimensional). Certain methods for position tracking involve a transmitter (e.g., an electronic tag) that is tracked by an array of receiver devices. For example, one method to track the position of a radio signal emitting tag is to use the amplitude of the tag signal at the various receiver devices to determine the position of the tag. By comparing the signal strength at each receiver position, a position tracking system can use triangulation or trilateration to determine the position of the tag.

SUMMARY

In one aspect, the invention features a position tracking system comprising a radio frequency (RF) transmitter transmitting an RF signal, an RF receiver in communication with the RF transmitter to receive the RF signal, and a controller in communication with the RF receiver to receive the RF signal and to perform a time of flight estimation of the RF signal from the transmitter to receiver and to measure phase shift for sub-wavelength determination. A computing system, in communication with the controller, receives the time of flight estimation and the measured phase shift and determines a position of the RF transmitter with respect to the RF receiver in response to the time of flight estimation and measured phase shift.

In another aspect, the invention features a position tracking system comprising a transmitting antenna transmitting a radio frequency (RF) signal and at least one receiving antenna acquiring the RF signal. One of the at least one receiving antenna and the transmitting antenna is designated a reference antenna. A processing unit determines a phase difference between the RF signal received by each receiving antenna and the reference antenna. The processing unit computes a position of the transmitting antenna with respect to the at least one receiving antenna in response to the phase difference determined for each receiving antenna.

In another aspect, the invention features a method of tracking position of a transmitting antenna comprising receiving a radio frequency (RF) signal, transmitted by the transmitting antenna, by at least one receiving antenna. One of the antennae is designated as a reference antenna. A phase difference is determined between the RF signal received by each receiving antenna and the reference antenna. A position of the transmitting antenna with respect to the at least one receiving antenna is computed in response to each phase difference determined for each receiving antenna.

In still another aspect, the invention features a method of tracking position comprising receiving a radio frequency (RF) signal, transmitted by a transmitting antenna, by a receiving antenna, performing a time of flight estimation of the RF signal from the transmitting antenna to the receiving antennae, measuring phase shift between the transmitted RF signal and the received RF signal at each receiving antenna, and determining a position of the transmitting antenna with respect to the receiving antennae in response to the time of flight estimation and the measured phase shift at each receiving antenna.

DETAILED DESCRIPTION

Position tracking systems described herein comprise a plurality of distinct, physically separated receivers, with antenna and hardware, and one or more transmitters, with antenna and hardware. To track a single transmitter (antenna), some embodiments of the position tracking systems include three receiver antennae for two-dimensional tracking and at least four receiver antennae for three-dimensional tracking. The receiver antennae provide a position reference frame in which the transmitter antenna is tracked. The receiver antennae are fixed in the tracking environment at known locations. Additional receiver antennae provide better coverage and more accuracy than fewer antennae, with additional complexity and cost. In one embodiment, the receiver antennae receive signals from a wireless transmitter and use the time of arrival information of those signals to calculate device position. The timing information is calculated using the carrier signal phase information of the transmitter, received at each receiver antenna, to compare time of arrival at each receiver antenna.

More transmitter antennae attached to or embedded in a tracked object allow the orientation of the object to be calculated based on geometric principles. For example, two transmitter antennae, separated by a distance d, yield a pointer, because the two transmitter antennae form a line with known direction. Three transmitter antennae provide enough information to calculate a three-dimensional orientation. The configuration of the position tracking system can be reversed, with the receiver antennae being tracked and the transmitter antennae providing the reference frame.

Figure 1:
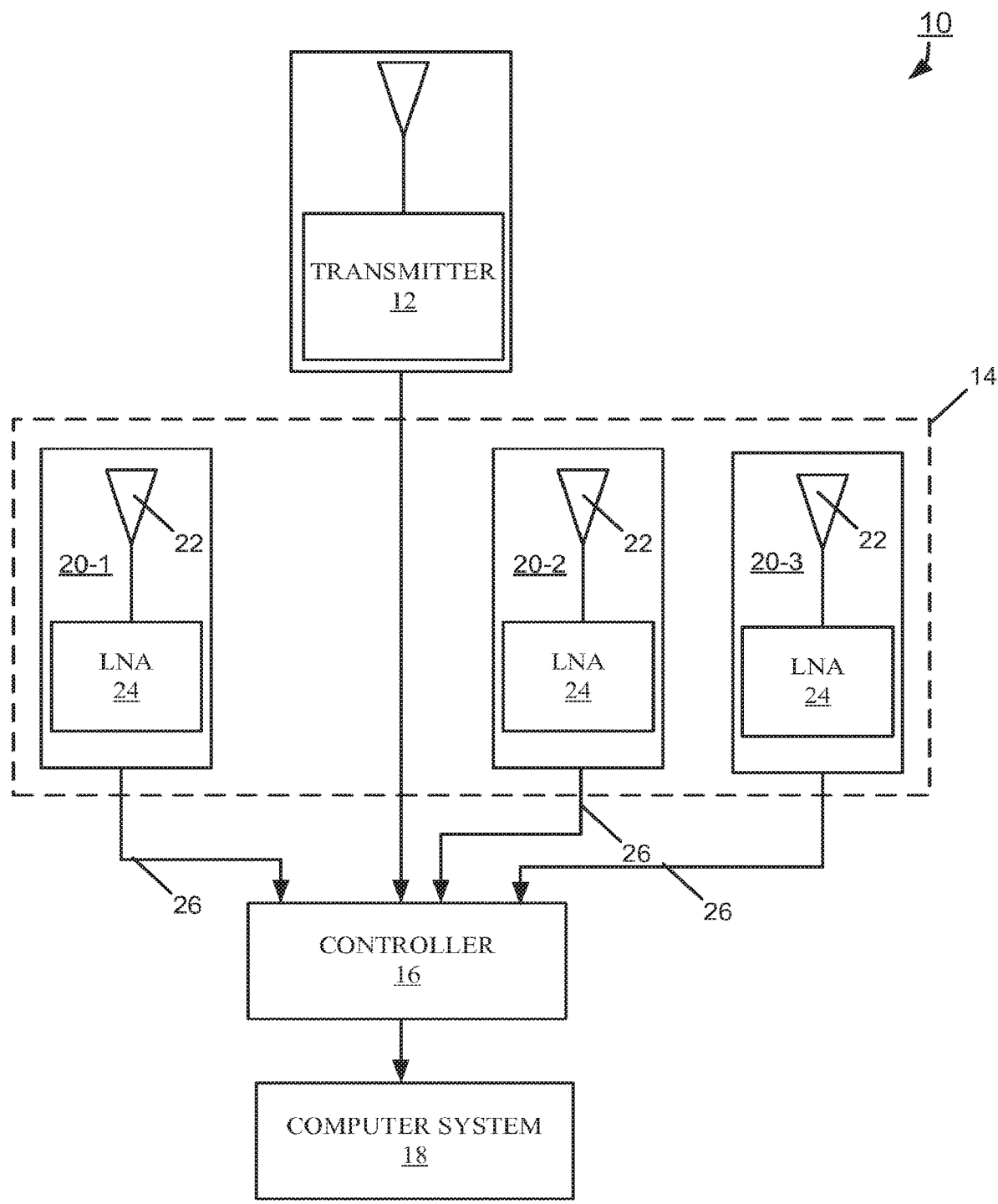
FIG. 1 is a block diagram of an embodiment of a position tracking system including a transmitter, one or more receivers, a controller unit, and a computer system.

FIG. 1 shows an embodiment of a position tracking system 10 including a transmitter 12, a receiver network 14, a controller 16, and a computer system 18. The transmitter 12 may be carried by, attached to, or embedded in an object whose position (x, y, z) is to be dynamically determined. The transmitter 12 can be embodied in such objects as a mobile cell phone, television or game controller, a tablet or laptop, etc. The receiver network 14 includes at least three receivers 20-1, 20-2, 20-3 (generally, 20). Each receiver 20 includes an antenna 22 and a low-noise amplifier (LNA) 24. The position (X, Y, Z) of each receiver antennae 22 is known. The antennae 22 are disposed near or around the transmitter 12. The transmitter 12 and each receiver 20 are in wired or wireless communication with the controller 16, which is in communication with the computer system 18. Although FIG. 1 shows three receivers each with one antenna, other embodiments can have fewer receivers, wherein one or more of the receivers have multiple antennae.

In brief, the three receivers 20 and transmitter 12 are used to determine the three-dimensional position of the object within the tracking environment. The transmitter 12 associated with an object continuously transmits pseudo noise (PN) code modulated RF (radio frequency) signals. The antenna 22 of each receiver 20 receives the modulated signals from the transmitter 12. The LNAs 24 amplify the received CDMA (Code Division Multiple Access) signals and send them to the controller 16 over communication links 26 (e.g., cables).

The controller 16 obtains a set of PN code correlative pulses through a correlation process and detects the carrier signals. The PN code correlative pulses and carrier signals are supplied to a code discriminator and a carrier phase discriminator, respectively, within controller 16. The code discriminator and carrier phase discriminator provide the coarse and fine measurement of the time difference of arrival of the transmitted RF signal, respectively. Combining the coarse and fine time differences of arrival eliminates ambiguity and provides highly accuracy position determination. The controller 16 sends the data to the computer system 18 to calculate the transmitter antenna position (x, y, z). The computer system 18 can display the position on a computer screen (e.g., as a cursor) or provide the transmitter position to an application for further use.

Figure 2:
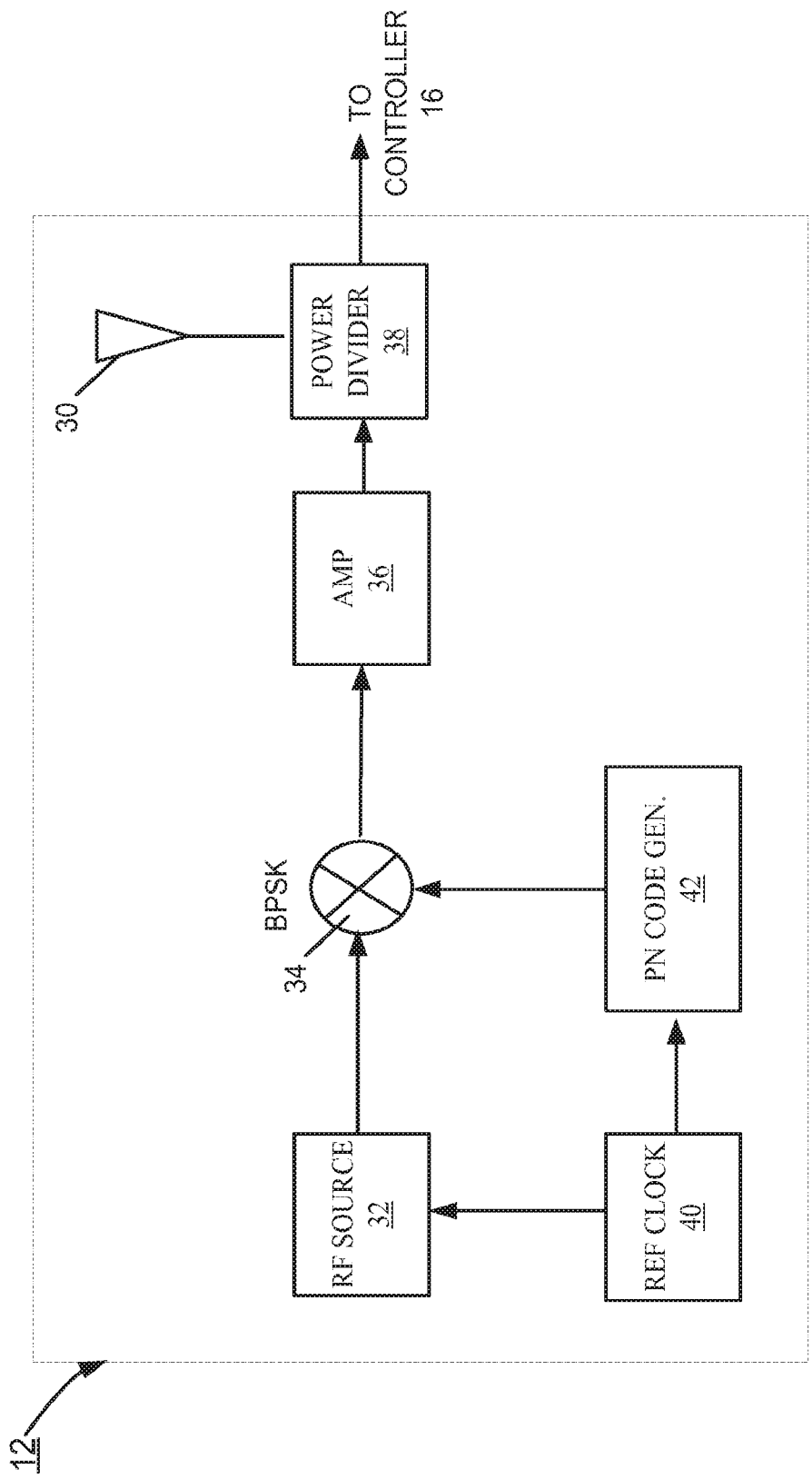
FIG. 2 is a block diagram of an embodiment of a transmitter whose position is tracked by the position tracking system of FIG. 1.

FIG. 2 shows an embodiment of the transmitter 12 including an antenna 30, an RF source 32, a Bi-Phase Shift Key (BPSK) modulator 34, an amplifier 36, a power divider 38, a reference oscillator or clock 40 and a pseudo-noise (PN) code generator 42.

During operation, the reference oscillator or clock 40 produces a stable reference clock signal, which passes to the PN generator 42 and to the RF source 32. Based on the reference clock signal, the RF source 32 produces an RF signal and the PRN code generator 42 produces a PN code. The Bi-Phase Shift Key (BPSK) modulator 34 combines the RF signal received from the RF source and the PN code received from the PRN code generator 42 to produce a modulated CDMA signal for transmission. The amplifier 36 receives and amplifies the CDMA signal. The power divider 38 delivers the CDMA signal to the transmit antenna 38 for RF transmission and to the controller 16 over a communication link 26.

Figure 3:
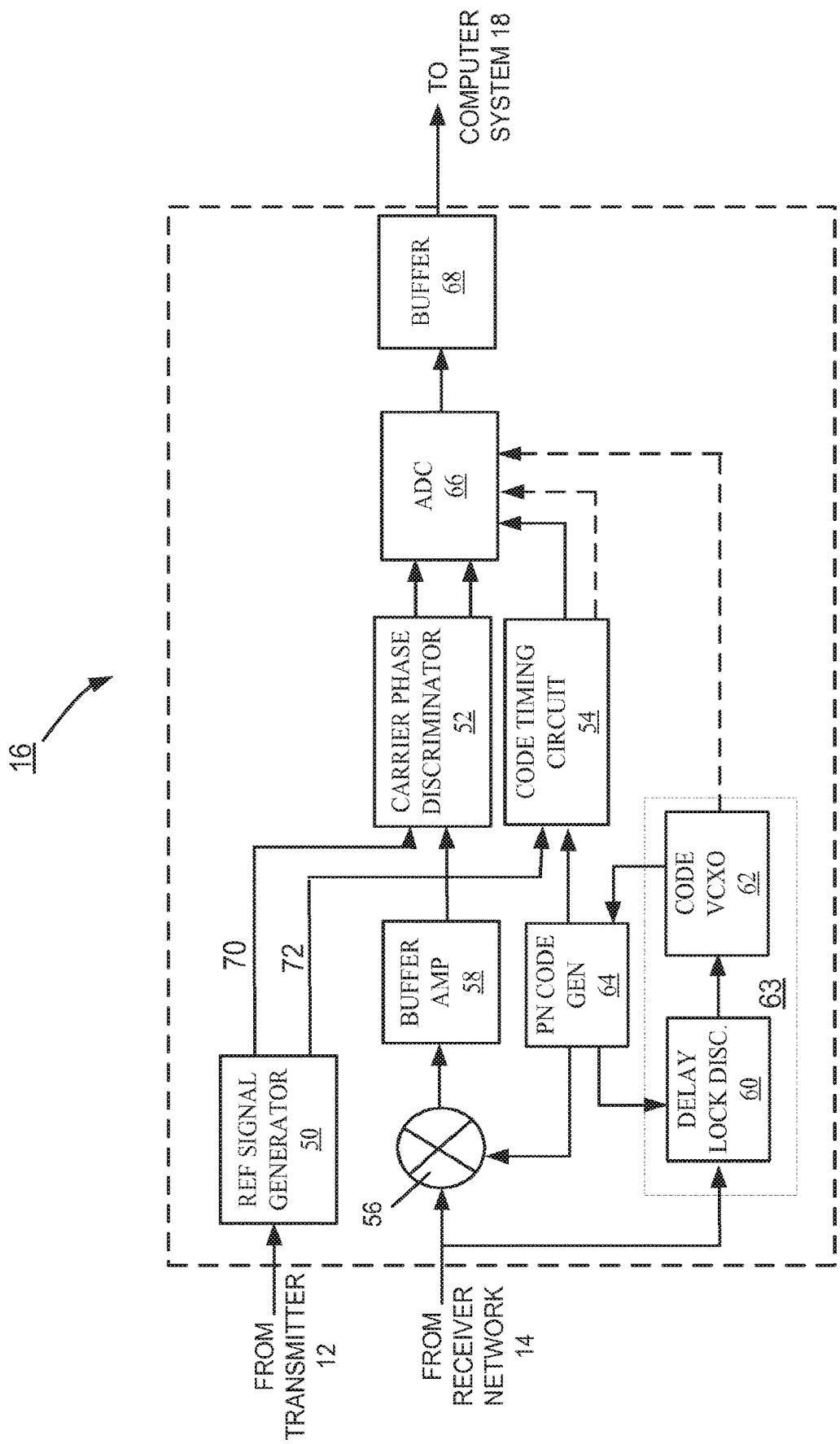
FIG. 3 is a block diagram of an embodiment of the controller of FIG. 1.

FIG. 3 shows an embodiment of the controller 16 including a reference signal generator 50 in communication with a carrier phase discriminator 52 and a code timing circuit 54. The reference signal generator 50 is in communication with the transmitter 12 to receive the modulated CDMA signal. The controller 16 also includes a BPSK demodulator 56, a buffer amplifier 58, code delay-lock discriminators 60, voltage controlled oscillator 62, and a PN code generator 64. The BPSK demodulator 56 and code delay-lock discriminators 60 receive the CDMA signals acquired by the receivers 20 of the receiver network 14. Each of the code VCXO 60, carrier phase discriminator 52 and a code timing circuit 54 are in communication with an analog-to-digital Converter (ADC) circuit 66. The ADC circuit 66 is in communication with a data buffer circuit 68. The data buffer circuit 68 is in communication with the computer system 18.

The reference signal generator 50 provides a set of carrier signals 70 to the carrier phase discriminator 52 and code synchronizing signals 72 to the code timing circuit 54. The code timing circuit 54 performs a coarse measurement of time difference of arrival to provide an absolute position measurement at low resolution. The carrier phase discriminator 52 produces a fine measurement of the time difference of arrival to achieve high resolution of the object position. The ADC circuit 66 receives and digitizes the set of measured carrier phase information from the carrier phase discriminator 52 and the code time difference information received from the code timing circuit 54. The buffer 68 buffers this digitized information, which is sent to the computer system 18 for object position calculations.

Figure 4:
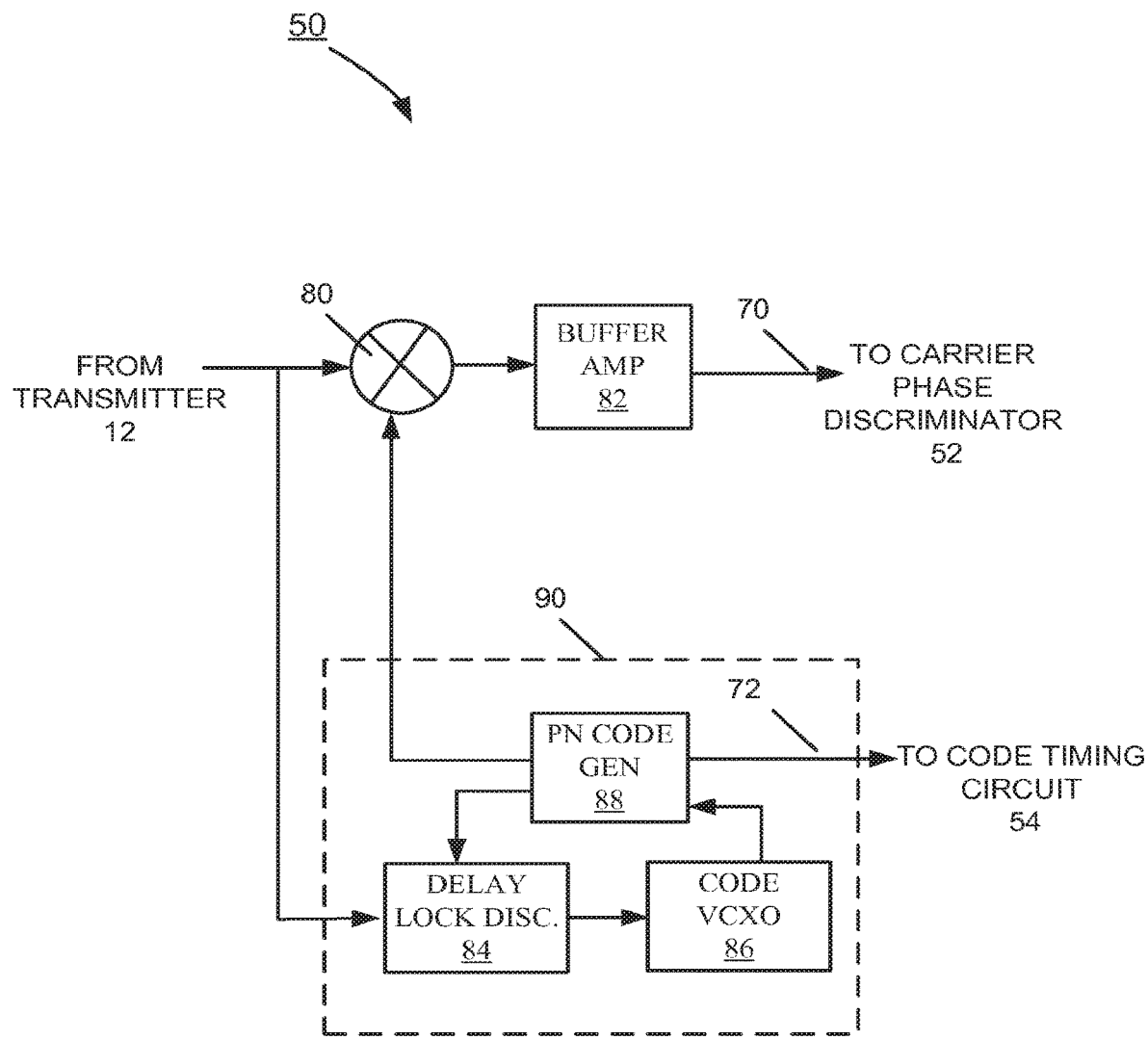
FIG. 4 is a block diagram of an embodiment of the reference signal generator of FIG. 3, including the carrier and PN code generator.

FIG. 4 shows an embodiment of the reference signal generator 50, including a BPSK demodulator 80, a buffer amplifier 82, a code delay-lock discriminator circuit 84, a voltage controlled oscillator 86, and a PN code generator 88. The code delay-lock discriminator circuit 84, voltage controlled oscillator 86, and PN code generator 88 form a delay lock loop (DLL) circuit 90. After the DLL circuit 90 becomes synchronized, the PN code generator 88 generates a synchronization PN code used to despread the received CDMA signals at the BPSK demodulator 80. This produces the carrier reference signal 70, which passes to the carrier phase discriminator 52 after amplification by the buffer amp 82. The DLL circuit 90 also produces the code reference signal 72 that passes to the code timing circuit 54 of FIG. 3.

Figure 5:
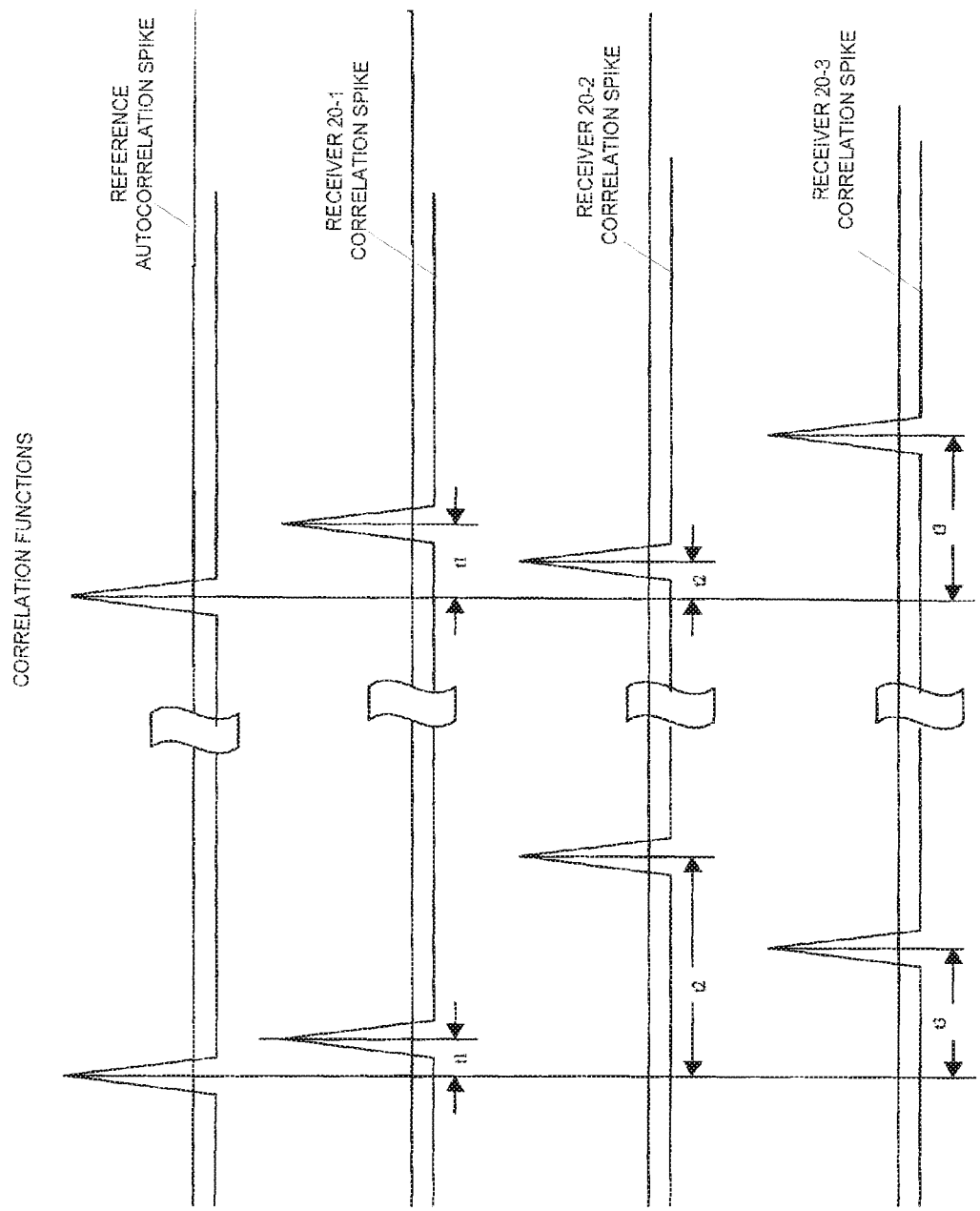
FIG. 5 is a graph showing code tracking time difference.
Figure 6:
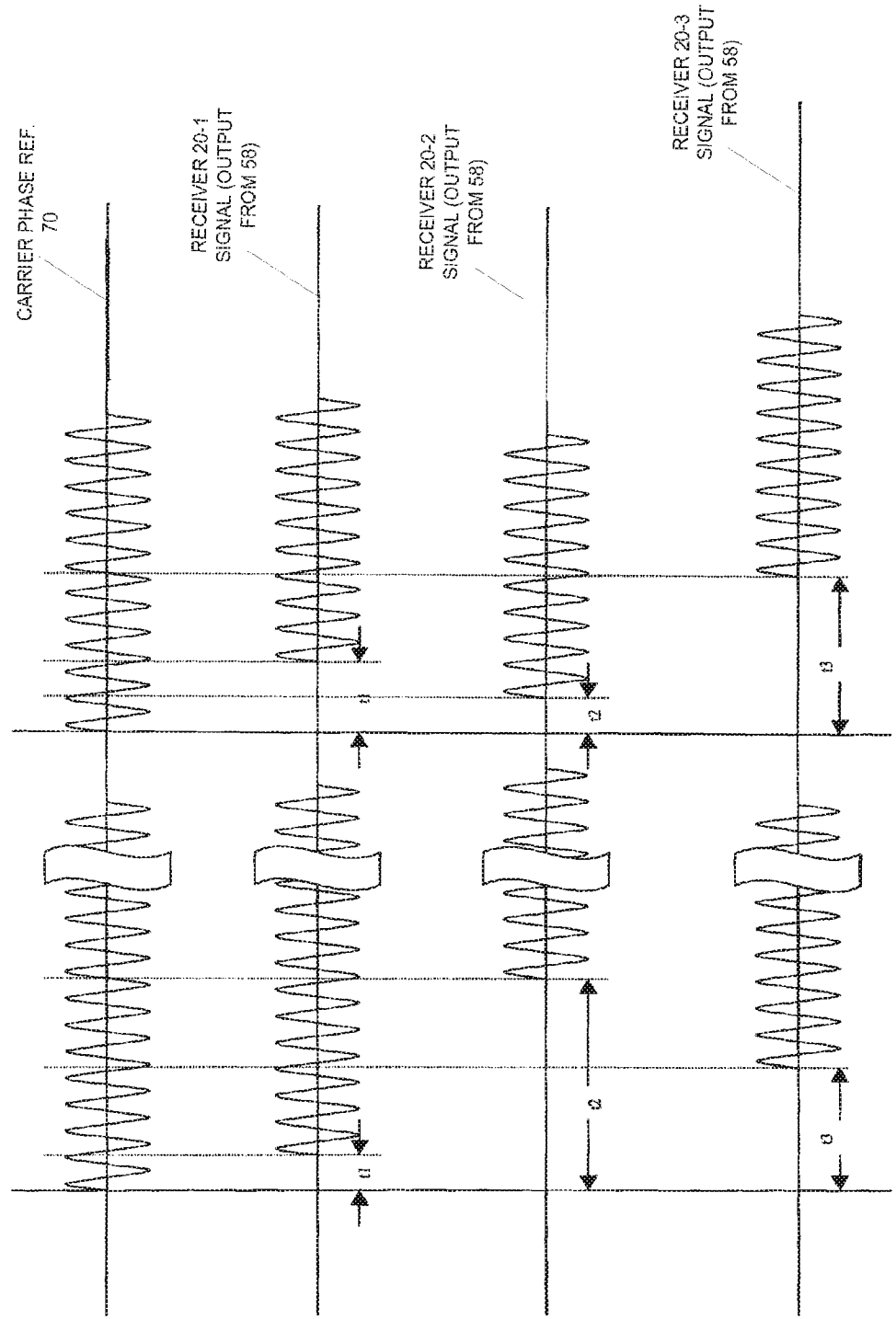
FIG. 6 is a graph of carrier recovery signals showing carrier phase differences.

FIG. 5 shows a set of correlative pulses including a reference correlative pulse and three received correlative pulses from receivers 20-1, 20-2, and 20-3. FIG. 6 shows a set of recovered carrier signals including a reference carrier signal from the reference channel and three received carrier signals from receivers 20-1, 20-2, and 20-3.

Figure 7:
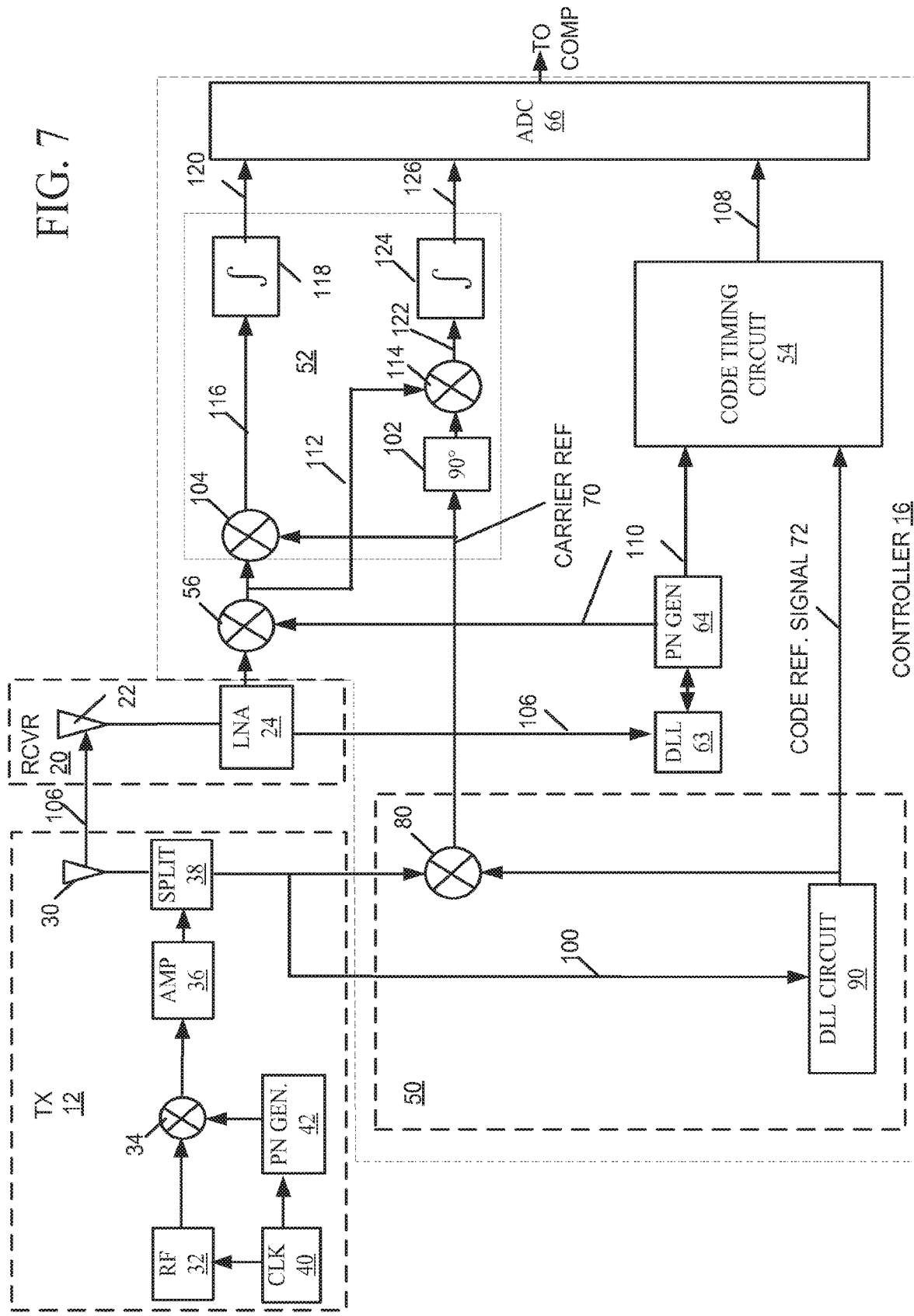
FIG. 7 is a block diagram of an embodiment of the position tracking system.

FIG. 7 shows an example embodiment of the position tracking system 10 of FIG. 1. In this embodiment, the reference clock 40 of the transmitter 12 supplies a 5.8 GHz clock signal to the RF source 32 and to the PN code generator 42 to ensure that the PN sequence and the carrier signals are synchronized. At the BPSK modulator 34, the 5.8 GHz RF signal is multiplied (modulated) with a 10-bit pseudo-noise (PN) sequence at a chip rate of 10 MHz received from the PN code generator 42. The BPSK modulator 34 produces a spread spectrum signal 100 centered at 5.8 GHz with a 10 MHz bandwidth. The amplifier 36 amplifies the signal 100. The power divider 38 splits the signal 100 between the transmitter antenna 30 and the reference signal generator 50 of the controller 16. The BPSK demodulator (multiplier) 80 of the reference signal generator 50 generates the carrier reference signal 70 and the DLL circuit 90 determines the amount of time delay introduced by the previous circuitry and provides the time delay necessary to synchronize the spreading sequence. The DLL circuit 90 operates similarly to a phase locked loop. The code reference signal 72 passes to a 90-degree phase shifter 102 and to a multiplier 104 of the carrier phase discriminator 52.

The receiver antenna 22 acquires the RF signal 106 transmitted by the transmitter 12. The amplifier (LNA) 24 of the receiver 20 amplifies the received signal 106. The BPSK demodulator 56 of the controller 16 demodulates the RF signal to recover the 5.8 GHz carrier signal 112, phase (time) shifted. For recovering the carrier signal 112, the PN code generator 64 provides a 10 MHz 10-bit pseudo-noise (PN) sequence 110, clocked by the DLL 63 (FIG. 3), to the BPSK demodulator 80. The PN sequence 110 passes also to the code timing circuit 54. DLL 63 generates a clock signal appropriately delayed to synchronize the PN sequence 110 with the received RF signal 106. The code timing circuit 54 compares the output 110 of PN sequence generator 64 with the code reference signal 72 provided by the PN sequence generator 42. The time difference between the PN sequences 72, 110 represents the coarse time of flight 108 of the signal. The coarse time of flight 108 passes to the A/D circuit 66.

The multiplier 104 of the carrier phase discriminator 52 uses the carrier reference signal 70 received from the reference generator 50 to demodulate the real component (in-phase (I)) 116 of the recovered carrier signal 112. An integrator 118 integrates the real component 116 for a period corresponding to an integral number of cycles of the recovered carrier signal 112, and provides the integrated real component 120 to the A/D circuit 66.

The carrier phase discriminator 52 also includes a multiplier 114, which receives the carrier reference signal 70 shifted by 90 degrees by the phase shifter 102, and uses the phase-shifted signal to demodulate the imaginary component (out-of-phase (Q)) 122 of the recovered carrier signal 112. An integrator 124 integrates the imaginary component 122 for a period corresponding to an integral number of cycles of the recovered carrier signal 112, and provides the integrated imaginary component 126 to the A/D circuit 66. The ratio of the two demodulated integrated signals 120, 126 yields the phase shift of the recovered carrier signal 112, which provides the fine measurement of the time of flight.

Additional receivers or receiver antennae can be utilized to provide additional information to the algorithm that calculates the position of the transmitter. Additional transmitter antennae or transmitters can be rigidly attached to provide a marker, where two rigidly attached antennae or transmitters can provide vector orientation information (line between the antennae) and 3 or more non-concentric antennae can provide three-dimensional orientation (multiple axes). A system containing a single transmitter with multiple antennae and/or markers can be used in medical procedures to provide the position and/or orientation of a medical object. A medical object can be a living entity, a provider of medical or surgical services, a medical instrument or a medical device. Multiple markers can also be tracked using other PN codes to minimize interference. Multiple medical objects can be tracked using multiple antennae and/or markers and relative measurements can be determined from the position and orientation of the various antennae/markers. Such a system can also be used for registering medical imaging with real time or non-real time surgical procedures and for real time data fusion. As would be appreciated in the art, the system described can be reversed, that is, one receiver being associated with an object that is to be tracked and multiple transmitters emitting CDMA signals.

Figure 8:
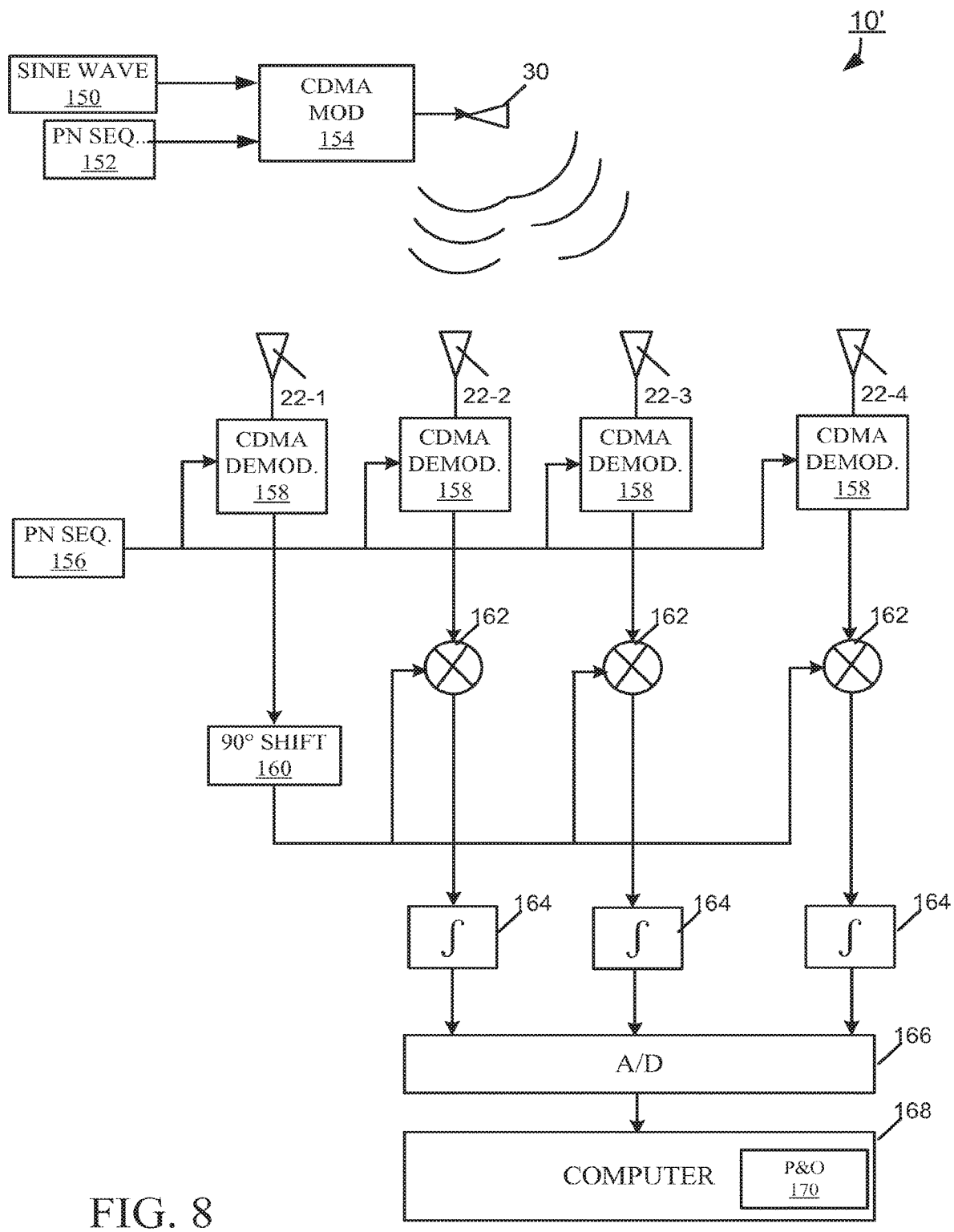
FIG. 8 is block diagram of another embodiment of a position tracking system.

FIG. 8 shows an example of the operation of a wireless position tracking system 10' using phase for timing comparisons. A sine wave 150 is used to modulate a pseudo-random noise sequence 152, as is known in the RF art, by a CDMA modulator 154. This type of modulation is commonly found in cell phones and other wireless devices that utilize radio signals for communication. The signal is amplified (not shown) and sent to the transmitter antenna 30. The signal is received by four receiver antennae 22-1, 22-2, 22-3, 22-4 (generally, 22). In this example, one of the receiver antennae 22-1, for example, is the reference. The four receiver antennae are demodulated by another pseudo-random noise sequence 156, which is identical to the PN sequence 152, although not synchronized in time to the PN sequence 152 (in other words, the starting points of the PN sequences 152, 156 are not the same). CDMA demodulators 158 retrieve the transmitted sine wave 150 from the signal received by the receive antennae 22. A phase shifter 160 shifts the reference sine wave by 90°. Multipliers 162 multiply the other signals by the shifted reference sine wave, and integrators 164 integrate the resulting signals, to provide a measure of the phase shift between the reference sine wave and the other received signals (differential phase). An analog-to-digital converter 166 converts the differential phases into a digital representation that is used by a position and orientation (P&O) algorithm 170 that runs on the computer system 168.

As known in the art, there are many variations possible to achieve the same functionality. Many of the noted components can be part of the computer system 168. For example, the computer system 168 can generate the sine wave 150 and the PN sequence 152. The multipliers 162 and integrators 164 can be disposed after the A/D 166 and be performed in a DSP (digital signal processing device). Other embodiments can use low pass filters instead of the integrators 164.

The P&O algorithm 170 is based on a best-fit method to the underlying equations. In this phase-based position tracking system 10', the phase is used to measure distance, absolute and/or relative transmitter position. The sine wave generator 150 can generate signals between 10MHz and 10GHz. This corresponds to wavelengths ($\lambda$) ranging from 30m to 0.03 m. 360° corresponds to one wavelength, and the distance is calculated by measuring the phase differences of the transmitter signal recorded at two receiver antennae. In the following equations, the variables r1, r2, r3, and r4 represent the distances between the receiver antennae positions and the transmitter position and are represented by the phases. Receiver positions are denoted as rcvr_posreceiver number,position coordinate, and are fixed, known quantities. Position coordinate 1, 2, 3 represent x, y, z, respectively.

$$r1 = \frac{}{\sqrt{(\text{rcvr\_pos}_{1,1} - x_1)^2 + (\text{rcvr\_pos}_{1,2} - x_2)^2 + (\text{rcvr\_pos}_{1,3} - x_3)^2}} \quad \text{(Eq. 1)}$$

$$r2 = \frac{}{\sqrt{(\text{rcvr\_pos}_{2,1} - x_1)^2 + (\text{rcvr\_pos}_{2,2} - x_2)^2 + (\text{rcvr\_pos}_{2,3} - x_3)^2}} \quad \text{(Eq. 2)}$$

$$r3 = \frac{}{\sqrt{(\text{rcvr\_pos}_{3,1} - x_1)^2 + (\text{rcvr\_pos}_{3,2} - x_2)^2 + (\text{rcvr\_pos}_{3,3} - x_3)^2}} \quad \text{(Eq. 3)}$$

$$r4 = \frac{}{\sqrt{(\text{rcvr\_pos}_{4,1} - x_1)^2 + (\text{rcvr\_pos}_{4,2} - x_2)^2 + (\text{rcvr\_pos}_{4,3} - x_3)^2}} \quad \text{(Eq. 4)}$$

These four equations are used to solve for $x_1$, $x_2$, and $x_3$, which represents the x,y,z, position of the transmitter, respectively. This can be solved in a least squares algorithm, such as Levenberg-Marquardt, in a Kalman filter or similar algorithms.

Figure 9:
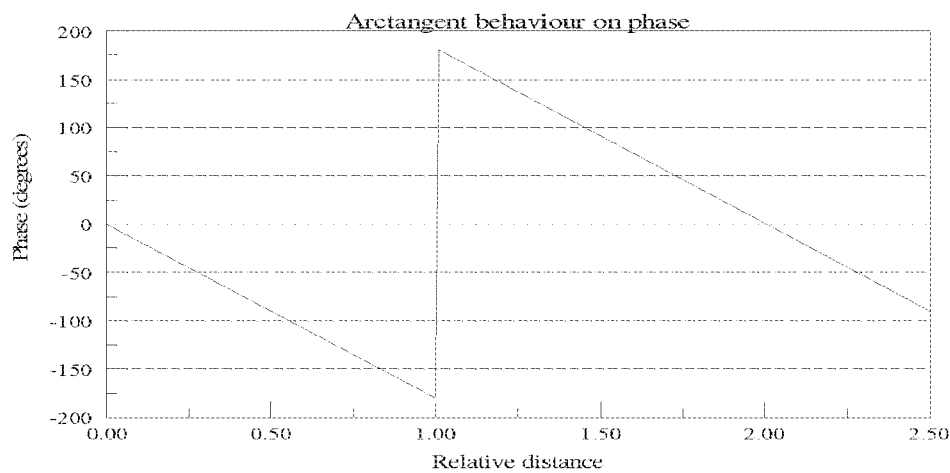
FIG. 9 is a graph of phase discontinuity.
Figure 10:
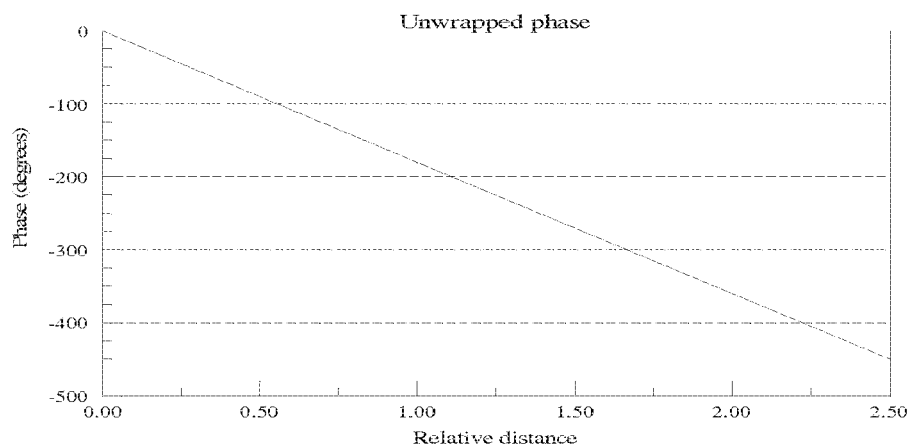
FIG. 10 is a graph of unwrapped phase.

When the wavelength is less than the tracking range, multiple cycles of the sine wave 150 occupy the tracking volume. To work in this environment, the P&O algorithm 170 starts at a known location and tracks through the cycle-to-cycle variation in order to maintain absolute tracking. Because phase shifts are typically computed using the arctangent function, a phase discontinuity occurs every ±180° (as shown in FIG. 9). Unwrapping the phase, as shown in FIG. 10, provides for a smooth transition and allows accurate tracking to occur. Various methods can be used to perform phase unwrapping. One example of such a method is described in "A Vector Filtering Technique for SAR Interferometric Phase Image," by Wang Feng, et al. Another method uses an alpha-beta filter. Alpha-beta filtering is commonly used in radar tracking and is related to Kalman filtering. One example of alpha-beta filtering is described in "The Alpha-Beta Filter," by Robert Penoyer, in the C Users Journal, July 1993.

Figure 11:
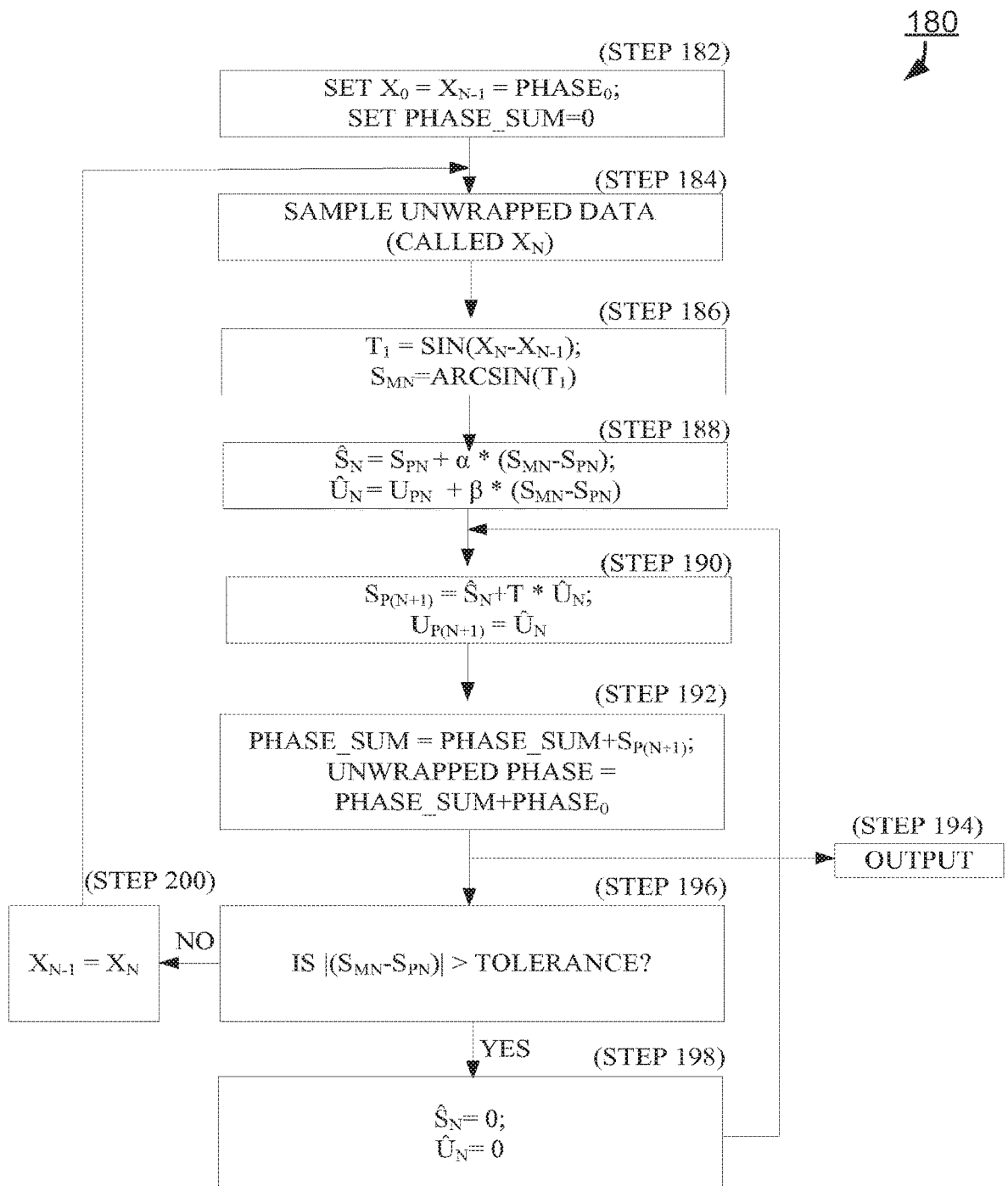
FIG. 11 is a flow diagram of an embodiment of a process for calculating position and orientation using CDMA (Code Division Multiple Access) and unwrapped phase data.

FIG. 11 shows an embodiment of a process 180 for calculating position and orientation using CDMA and unwrapped phase data. At step 182, the phase_sum is set to zero and an initial phase value is saved. After this initialization of the first sample, all succeeding samples are obtained in step 184. At step 186, the difference ($t_1$) between the latest and the previous phase difference sample is calculated and the sine of the difference ($t_1$) is calculated. This operation retains the sign of the data and unwraps the data. The arcsine then converts the deltas back into angles. The main processing of the alpha-beta filter occurs in steps 188 and 190. This takes the value from the arcsine and filters it according to the values of alpha and beta, which are determined to provide good noise and dynamic performance. The output of the filter is accumulated (step 192) in phase_sum. This accumulation keeps a running tally of the change in phase difference. This is added to the initial phase difference value from step 182 and is called the unwrapped phase (output in step 194), which is used in the P&O algorithm 170.

At the end of each cycle, at step 196, $S_{mn}$ is compared to $S_{pn}$. If the difference exceeds a tolerance, this indicates that the filter is lost, for example, because of multipath or to a complete loss of signal. If the filter is lost, $\hat{S}_n$ and $\hat{U}_n$ are set to zero at step 198 and processing continues at step 190. Otherwise, $X_{n-1}$ is set to $X_n$ at step 200 and processing repeats with new data obtained at step 184. Each phase difference gets its own unwrapping. The unwrapping typically occurs in a processor.

Whereas CDMA techniques help to mitigate multipath interference, additional techniques can be used to increase the robustness of the position tracking system. One technique uses additional receiver antennae. The additional receiver antennae provide additional information in the event the signals of another receiver are corrupted by multipath effects. A loss or corruption of signal indicates that a particular signal should not be used in the computation of the P&O algorithm 170. Another technique includes cycling the designation of the reference antenna through the receiver antennae. When the reference antenna is blocked, all the phase difference signals are deemed corrupt. Cycling through the different receiver antennae gives the position tracking system an opportunity to find a good reference. It may then be possible to re-acquire signals on the next cycle. This can require more multiplexing paths, and additional bookkeeping, but increases system robustness.

Another technique to make the position tracking system more robust, especially when the wavelength is less than the tracking volume (i.e., range), is to keep track of signals that may be lost because of multipath effects or signal blockage. After a valid solution to the P&O algorithm 170 is available, the solution is used to calculate the expected phase difference for the different channels. Under normal conditions, these calculated values closely agree to the measured values. When a signal is lost, these calculated values can be used instead of the measured values shown in step 184. That way, after the channel signal is unblocked and received again, it can resume being used without losing track of the correct phase difference.

These methods can also be subsumed by a Kalman filter implementation of the unwrapping and the P&O algorithm. Because the tracking equations (Eq. 1-Eq. 4) can be formulated in a Kalman framework, both the P&O algorithm 170 and unwrapping can be performed in one consistent algorithm. Because dynamic estimates are available in Kalman formulations, these can be used to detect when signals are degraded and/or lost. Means for performing Kalman filtering are described in "Optimal Estimation with an Introduction to Stochastic Control Theory," by Frank Lewis, Wiley-Interscience, 1986.

The sine wave 150 in FIG. 8 is described as a single frequency, where its wavelength is either less than or greater than the tracking volume. Alternatively, multiple frequencies can be used together to provide both coarse and fine resolution phase difference signals. This provides both absolute and relative measurements concurrently. Multiple frequencies can also be used to enhance multipath immunity, because different frequencies respond differently to multipath.

Figure 12:
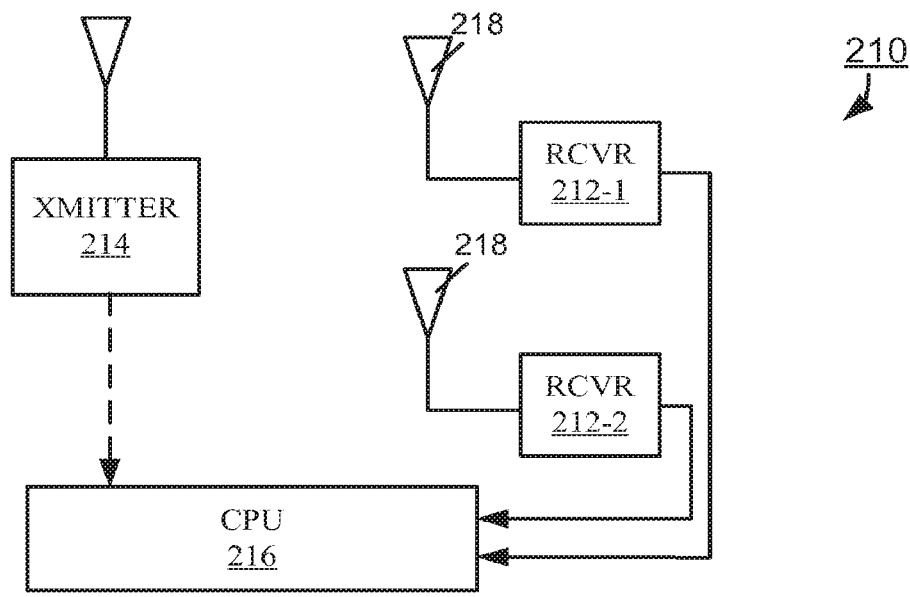
FIG. 12 is a block diagram of an embodiment of a tracking and/or communication system.

FIG. 12 shows an embodiment of a phase-based communication system 210 that employs phase detection techniques for tracking position. The communication system 210 includes a plurality of receivers 212-1, 212-2, a transmitter 214 whose identification and/or position is to be determined, and a central processing unit (CPU) 216 to process the electromagnetic signals (e.g., radio, microwave), convert data, perform calculation of the coordinates of one or more transmitters, and identify the ID information of each transmitter.

Receivers 212-1, 212-2 are part of the receiver network. Coordinates of each phase center of the receivers' antennae 218 are predetermined and used as coordinate references for correlating the coordinate location of the transmitter 214 within the receiver network. Also, the phase center of the transmitter antenna is used as a reference for the coordinate location of the transmitter 214.

In this tracking and/or communication system, the transmitter 214 continuously transmits pulsed signals in the form of multiple frequencies, and the receivers 212-1, 212-2 receive the signals, amplify, and send these signals to the central processing unit 216 via cables. In the central processing unit 216, one or more phase discriminators (not shown) are used to provide carrier phase difference information between received carrier signals or between received signals and reference signals. The central processing unit 216 also includes an analog-to-digital (A/D) converter (not shown) to digitize the phase differences. According to the carrier phase difference information, the identification of the transmitter 214, its physical position information, or both, can be determined.

Figure 13:
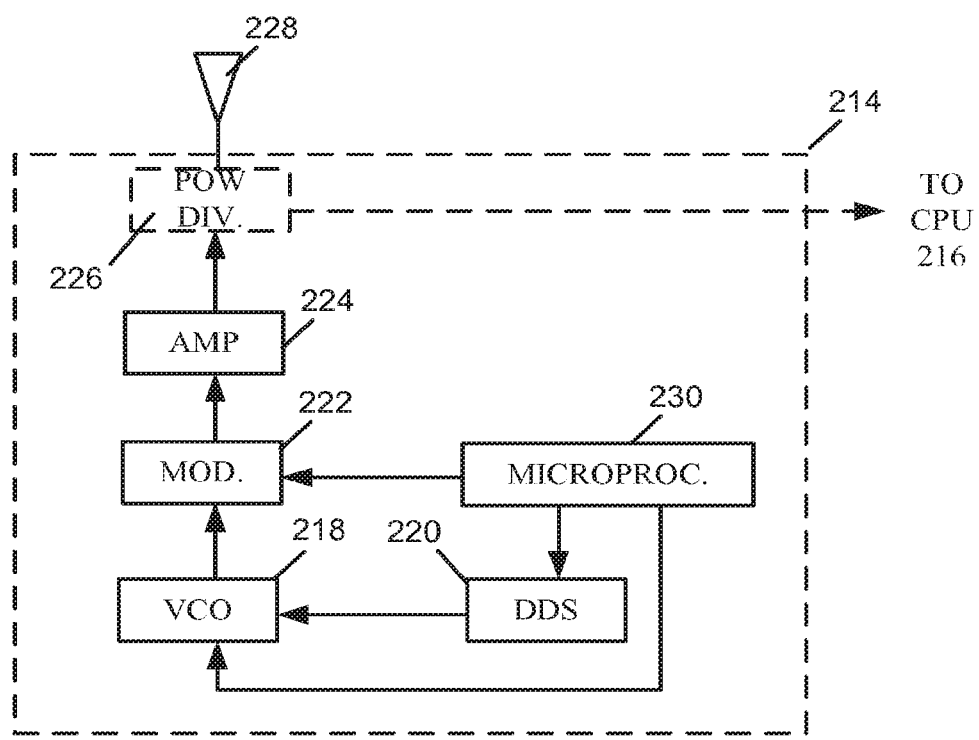
FIG. 13 is a block diagram of an embodiment of a transmitter.

FIG. 13 shows an embodiment of the transmitter 214, including a VCO 218 to generate a continuous RF or microwave signal, a Direct Digital Synthesis (DDS) signal source 220, a pulse modulator 222, a power amplifier 224, a power divider 226 (for wired reference channel embodiments), an antenna 228, and a microprocessor unit 230.

The VCO 218 in the transmitter 214 generates a continuous RF or microwave signal that depends on the signal frequency produced by the DDS source 220. In this system, any frequency can be chosen depending on the requirement for the resolution of the coordinates (e.g., the higher the frequency, the higher the resolution). The DDS signal frequency depends on the Frequency Word controlled by the microprocessor 230. This DDS signal works as a reference clock for the VCO 218 to generate different frequencies for hopping.

Figure 14:
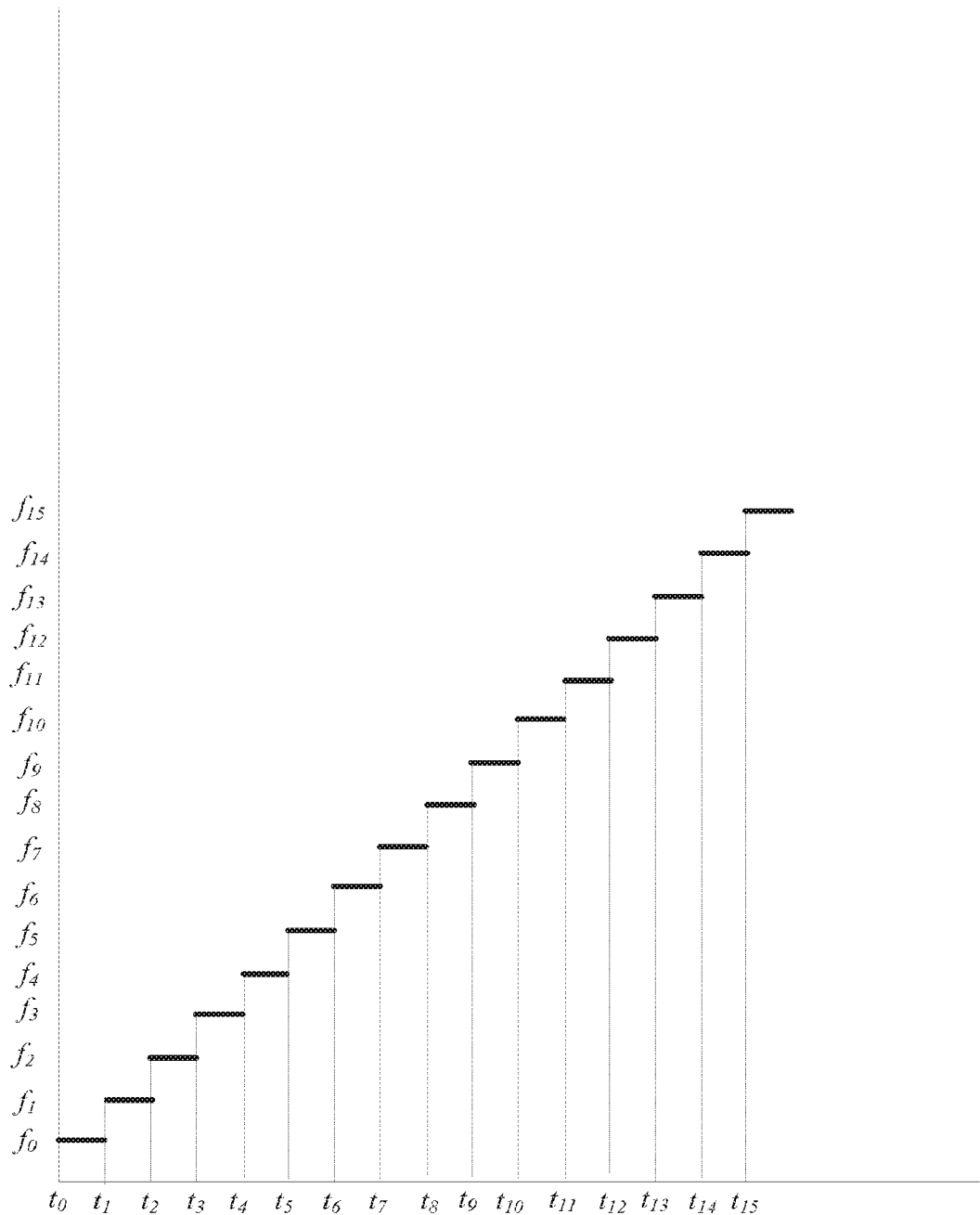
FIG. 14 is an example of an ID frequency hopping time pattern.

FIG. 14 shows an example output of a DDS signal source 220 using different time slots. The particular output is for illustration purposes only; any sequence of the output of the DDS signal source 220, which can be randomly chosen, can serve as the identification of the transmitter 214. Returning to FIG. 13, in one embodiment the pulse modulator 222 is a switch controlled by the pulse signal generated by the microprocessor 230 synchronized to the system crystal. This pulsed RF or microwave signal is amplified by the power amplifier 224 and transmitted from the antenna 228. If the transmitter 214 is wired, the power divider 226 is used for a wired carrier phase reference. One path of the power divider 226 is transmitted by the antenna 228 and one path is used as a carrier phase reference to the central processing unit 216. For a wireless embodiment, the power divider 226 is not be used.

Figure 15:
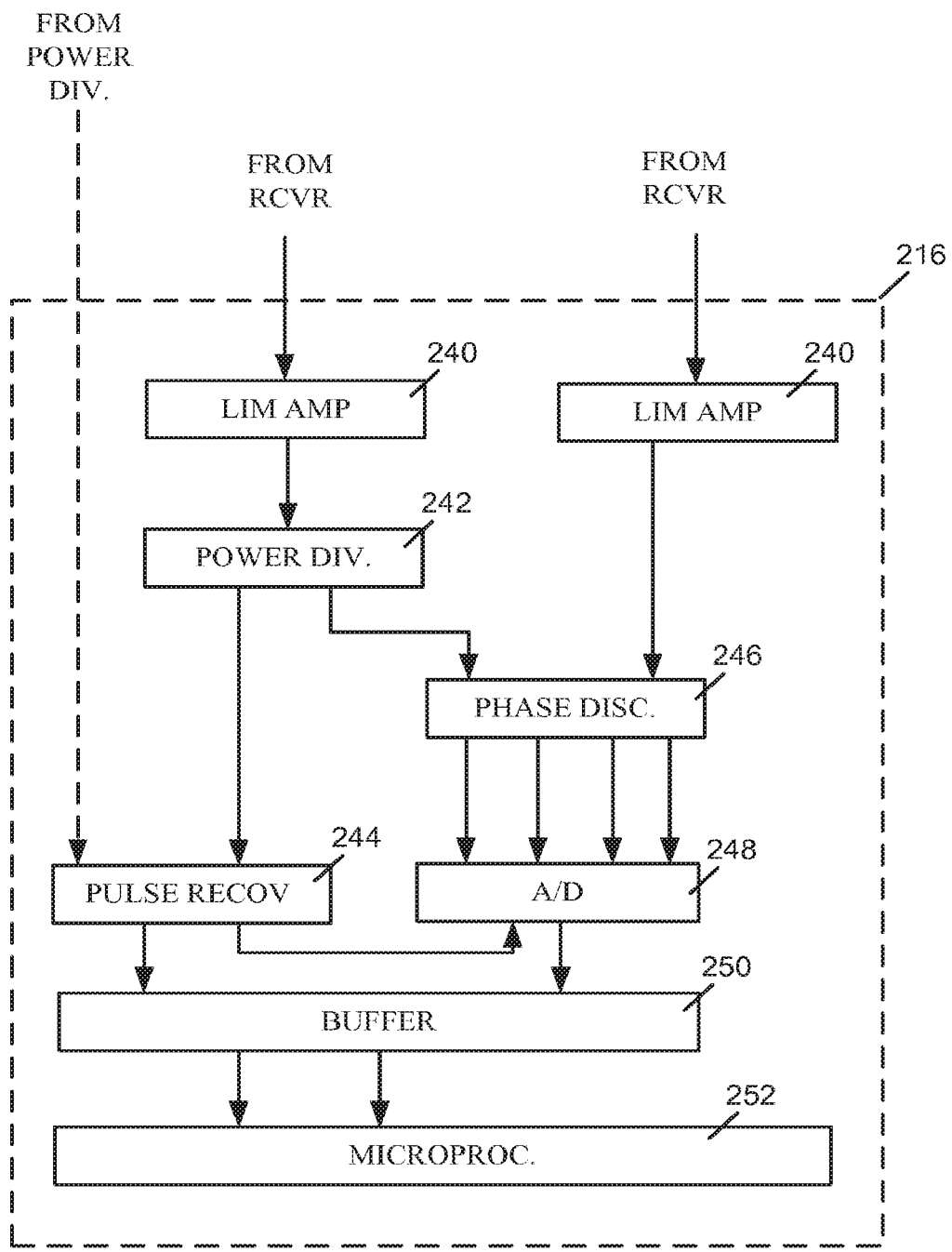
FIG. 15 is a block diagram of an embodiment of a central processing unit (CPU).

FIG. 15 shows an embodiment of the central processing unit 216 for a preferred embodiment in which the carrier phase differences determine the identification, position coordinates, or both, of the transmitter 214. In this embodiment, the central processing unit 216 includes limiting amplifiers 240, a power divider 242, a pulse recovery and appropriate pulse generator circuit 244, a phase discriminator 246, an analog-to-digital converter 248, data buffer 250, and a microprocessor 252.

Each limiting amplifier 240 is used to limit the amplitude of the pulsed RF or microwave signal coupled from the receivers 212-1, 212-2 so that the output of each phase discriminator 246 is dependent on the carrier phase differences. The power divider 242 divides one of the received signals for phase discriminating and pulse recovery. The phase discriminator 246 is used to discriminate phase differences of individual hopped frequencies. The analog-to digital converter 248 converts the carrier phase difference from analog to digital. The data buffer 250 functions as the storage space to store the digital data for the data processing.

The control signals for the A/D converters 248 and the data buffer 250 come from the pulse recovery circuit 244.

The data collected from the data buffer 250 contains the phase differences of the different frequencies. As shown in the frequency-hopping pattern of FIG. 14, the known frequency change pattern provides a phase difference pattern between transmitted frequencies. This information can be used to determine the identification of the transmitter. Depending on the known hopping pattern, using a "best-line-fit" technique, the best line fit data for the collected data and the associated error can be calculated to produce a range that determines how many measured data are "good" and how many measured data are "bad". "Good" data means the phase differences of these frequencies are useable, and "bad" data means the phase differences of these frequencies are too affected by multipath to use for comparison calculations. Ignoring the "bad" data and using the "good" data for averaging is a preferred method for determining phase differences. These carrier phase differences are used to determine the time difference of arrival. Depending on the time differences of arrival at the receivers 212-1, 212-2, the position information (i.e. the coordinates) of the transmitter 214 can be determined. Because the carrier phase differences of the received signals are a fraction of a wavelength of the carrier frequencies, the position of the transmitter position can be obtained with high accuracy.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

The invention claimed is:

1. A position tracking system comprising:
a transmitting antenna transmitting a radio frequency (RF) signal modulated by a first pseudo-random noise sequence;
a plurality of receiving antennae acquiring the RF signal, one of the plurality of receiving antennae being designated a reference antenna, the plurality of receiving antennae including at least three receiving antennae;
a corresponding plurality of demodulators, each demodulator of the plurality of demodulators coupled to a respective one of the plurality of receiving antennae and configured to demodulate the RF signal received by the respective receiving antenna using a second pseudo-random noise sequence;
a processing unit determining phase differences between a reference recovered signal derived from the demodulated RF signal received by the reference antenna and a recovered signal derived from the demodulated RF signal received by each remaining receiving antenna of the plurality of receiving antennae, the processing unit computing a position of the transmitting antenna with respect to the plurality of receiving antennae based on the determined phase differences.

2. The position tracking system of claim 1 wherein the designated reference antenna is dynamically re-assignable among the plurality of receiving antennae.

3. The position tracking system of claim 1 wherein a wavelength of the RF signal transmitted by the transmitting antenna is smaller than a tracking volume in which the transmitting antenna is located.

4. The position tracking system of claim 1 further comprising a modulator coupled to the transmitting antenna and configured to produce and provide to the transmitting antenna the RF signal modulated by the first pseudo-random noise sequence.

5. The position tracking system of claim 4 wherein the modulator is configured to modulate the RF signal using code division multiple access modulation.

6. The position tracking system of claim 4 wherein the second pseudo-random noise sequence is identical to the first pseudo-random noise sequence, and wherein the first and second pseudo-random noise sequences are not synchronized to one another.

7. The position tracking system of claim 6 wherein the processing unit includes a phase shifter configured to impart a 90-degree phase shift to the reference recovered signal to produce a phase-shifted reference recovered signal.

8. The position tracking system of claim 7 wherein the processing unit further includes a plurality of multipliers, each multiplier configured to receive the phase-shifted reference recovered signal and the recovered signal from a respective one of the plurality of demodulators, and to multiply the recovered signal by the phase-shifted reference recovered signal to provide a resulting signal.

9. The position tracking system of claim 8 wherein the processing unit further includes a plurality of integrators, each integrator configured to receive and integrate the resulting signal from a respective one of the plurality of multipliers to determine the phase differences.

10. The position tracking system of claim 9 wherein the processing unit further includes an analog-to-digital converter configured to convert the phase differences into a digital representation, and a computer system configured to execute a position and orientation algorithm using the digital representation to compute the position of the transmitting antenna with respect to the plurality of receiving antennae.

11. The position tracking system of claim 1 wherein the processing unit applies a filter to unwrap phase for each determined phase difference.

12. The position tracking system of claim 1 wherein the processing unit determines a solution for the position of the transmitting antenna, uses the solution to calculate an expected phase difference for each receiving antenna, and uses the calculated expected phase difference for a given receiving antenna when the given receiving antenna loses the transmitted RF signal.

13. The position tracking system of claim 1 wherein the at least three receiving antennae are disposed at known locations, and wherein the processing unit computes a two-dimensional position of the transmitting antenna.

14. The position tracking system of claim 1 wherein the at least three receiving antennae includes at least four receiving antennae disposed at known locations, and wherein the processing unit computes a three-dimensional position of the transmitting antenna.

15. The position tracking system of claim 1 further comprising at least two additional transmitting antennae disposed at known positions.

16. The position tracking system of claim 1 wherein the RF signal includes an identifier associated with the transmitting antenna, the identifier corresponding to a code generated from a predetermined sequence of frequency hops.

17. A method of tracking a position of a transmitting antenna, comprising:
receiving a radio frequency (RF) signal modulated by a first pseudo-random noise sequence, transmitted by the transmitting antenna, with at least three receiving antennae;
designating one of the at least three receiving antennae as a reference antenna;
demodulating the RF signal received by the reference antenna with a second pseudorandom noise sequence to produce a reference recovered signal;
demodulating the RF signal received by each remaining receiving antenna of the at least three receiving antennae with the second pseudo-random noise sequence to produce recovered RF signals;
determining phase differences between the reference recovered signal and the recovered signals; and
computing the position of the transmitting antenna with respect to the receiving antennae based on the computed phase differences.

18. The method of claim 17, further comprising applying a filter to unwrap phase for each of the computed phase differences.

19. The method of claim 17, further comprising determining a solution for the position of the transmitting antenna, calculating an expected phase difference for each receiving antenna based on the solution and previous phase data, and using the expected phase difference calculated for a given receiving antenna when the given receiving antenna loses the transmitted RF signal.

20. The method of claim 17, further comprising generating an identifier associated with the transmitting antenna by generating a code from a predetermined sequence of frequency hops.

21. A position tracking system comprising:
a plurality of transmitting antennae each transmitting a radio frequency (RF) signal modulated by a first pseudo-random noise sequence, the plurality of transmitting antennae including at least three transmitting antennae and one of the plurality of transmitting antennae being designated a reference antenna;
a receiving antenna configured to receive the RF signals transmitted by the plurality of transmitting antennae;
a demodulator coupled to the receiving antenna and configured to demodulate the RF signals received by the receiving antenna using a second pseudo-random noise sequence;
a processing unit determining phase differences between a reference recovered signal derived from the demodulated RF signal transmitted by the reference antenna and a recovered signal derived from the demodulated RF signal transmitted by each remaining transmitting antenna of the plurality of transmitting antennae, the processing unit computing a position of the receiving antenna with respect to the plurality of transmitting antennae based on the determined phase differences.

22. The position tracking system of claim 21 wherein the designated reference antenna is dynamically re-assignable among the plurality of transmitting antennae.

23. The position tracking system of claim 21 wherein a wavelength of each of the RF signals transmitted by the transmitting antennae is smaller than a tracking volume in which the receiving antenna is located.

24. The position tracking system of claim 21 wherein the second pseudo-random noise sequence is identical to the first pseudo-random noise sequence, and wherein the first and second pseudo-random noise sequences are not synchronized to one another.

25. The position tracking system of claim 21 wherein the processing unit applies a filter to unwrap phase for each determined phase difference.

26. The position tracking system of claim 21 wherein the at least three transmitting antennae are disposed at known locations, and wherein the processing unit computes a two-dimensional position of the receiving antenna.

27. The position tracking system of claim 21 wherein the at least three transmitting antennae includes at least four transmitting antennae disposed at known locations, and wherein the processing unit computes a three-dimensional position of the receiving antenna.

* * * * *